United States Patent [19]

Steffen

[11] Patent Number: 4,750,186
[45] Date of Patent: Jun. 7, 1988

[54] SEALED GAS LASER

[75] Inventor: Jürg Steffen, Sigriswil, Switzerland

[73] Assignee: Asulab S.A., Bienne, Switzerland

[21] Appl. No.: 7,240

[22] Filed: Jan. 27, 1987

[30] Foreign Application Priority Data

Jan. 27, 1986 [FR] France ............................ 86 01204

[51] Int. Cl.⁴ .............................................. H01S 3/03
[52] U.S. Cl. ........................................ 372/61; 372/62; 372/65
[58] Field of Search ....................... 372/61, 34, 62, 65, 372/76

[56] References Cited

U.S. PATENT DOCUMENTS

| | | | |
|---|---|---|---|
| 3,624,543 | 11/1971 | Rockwell, Jr. | 372/62 |
| 3,670,262 | 6/1972 | Hallock et al. | 378/62 |
| 3,671,883 | 6/1972 | Smars et al. | 331/94.5 |
| 3,705,999 | 12/1972 | Hermann et al. | 313/197 |
| 3,763,492 | 10/1973 | McMahan | 378/34 |
| 4,001,720 | 1/1977 | Carbonetta, Jr. | 372/62 |
| 4,378,600 | 3/1983 | Hobart | 372/62 |
| 4,477,907 | 10/1984 | McMahan | 372/61 |
| 4,553,241 | 11/1985 | Chaffee | 378/63 |
| 4,564,948 | 1/1986 | Golser | 378/61 |
| 4,649,546 | 3/1987 | Schmid | 378/103 |
| 4,679,202 | 7/1987 | Maloney et al. | 378/34 |
| 4,685,109 | 8/1987 | Carlson et al. | 378/61 |

OTHER PUBLICATIONS

Patents Abstracts of Japan, vol. 9, No. 147, Jun. 21, 1985.
Optics & Spectroscopy, vol. 26, #2, Feb. 1969, pp. 160–161.

Primary Examiner—Léon Scott, Jr.
Attorney, Agent, or Firm—Griffin, Branigan & Butler

[57] ABSTRACT

The gas laser of this invention includes a discharge tube formed from a plurality of metallic bodies arranged in end to end alignment. The tube is terminated by a cathode chamber at one end and an anode chamber at the other end. Each of the metallic bodies and the cathode and anode chambers is provided at least with one tubular element said elements being joined together by means of a glass welding bead. The material forming said tubular elements has the same coefficient of thermal expansion as glass. The invention finds particular application to completely sealed lasers.

10 Claims, 3 Drawing Sheets

SEALED GAS LASER

This invention concerns a gas laser including a discharge tube formed from a plurality of metallic bodies of a high thermal conductivity arranged end to end without contacting one another and provided with a central opening to form an ionisation chamber, an anode chamber arranged at one end of the tube and provided with an anode support, a cathode chamber arranged at the other end of the tube and provided with a cathode support, and gas recirculation ducts providing a communication path between the anode and cathode chambers other than that of the ionisation chamber.

BACKGROUND OF THE INVENTION

A gas laser corresponding basically to the description hereinbefore given has been described in European Patent No. EP-B-O-048 690. The discharge tube includes metallic bodies having high thermal conductivity, for instance of aluminum alloy generally taking the form of discs provided with cooling fins and having an opening pierced in their center. These metallic bodies are arranged end to end so that their central openings are aligned and form the laser discharge tube. Such tube is intended to be filled with a gas, for instance argon, under slight pressure.

End chambers one of which includes a cathode and the other an anode are arranged respectively at each end of the tube. Such anode and cathode are intended to create and maintain an electrical discharge in the gas filling the tube.

The metallic bodies of the tube are fixed to an envelope exterior to the latter in a manner to compress them against one another and thus to compress the toroidal seals located between these bodies and formed of rubber or other plastic material.

During operation of the laser, the several metallic bodies of the tube are brought to different potentials and the wall of the tube is subjected to an intense ionic bombardment from the plasma formed by the gas filling the tube. The bodies forming the tube must thus be protected against erosion produced by such ionic bombardment and to be electrically insulated from one another. This protection and insulation are assured by means of an insulating layer preferably of aluminum oxide which covers entirely the metallic bodies.

The heat given off by the electrical discharge maintained within the gas filling the tube during operation of the laser is removed by a fluid which may be water circulating in the space situated between the fins of the elements and the outer element of the tube.

The gas discharge tube described hereinabove exhibits certain disadvantages.

Thus, the increase in the temperature of the metallic bodies of the tube during operation of the laser brings about expansion of these elements. Since the expansion coefficient of the material of the metallic bodies is different from that of the insulating layer which covers them, such expansion causes cracks to appear in the insulating layer. The presence of such cracks permits the cooling liquid of the tube to penetrate to the interior of the latter which prevents proper operation of the laser.

In addition, when the laser is put into service or following a prolonged interruption of its operation, the tube must be evacuated of the air or gas contained therein before being filled or refilled by the desired gas.

As is well known, this evacuation is facilitated and improved by simultaneous heating of the tube.

However, the presence of rubber or plastic material seals between the metallic bodies prevents heating the tube to a temperature as high as would be desirable. Furthermore, the seals retain at their surface a non-negligible quantity of air or gas, the presence of which increases notably the duration of this evacuation operation.

In the same manner, such seals may be destroyed by the ionic bombardment originating from the plasma formed in the tube during operation of the laser. The metallic bodies of the tube must thus be provided with ribs and grooves disposed so as to protect the seals against such bombardment. Such ribs and grooves complicate the manufacture of these elements and increase their cost.

In order to avoid these difficulties, it would be possible to replace the seals of plastic material by metallic seals, for instance of copper or aluminum, such as those which are currently employed in apparatus including a sealed enclosure which must withstand high differences in pressure and/or temperature.

The employment of such seals enables heating the tube to a high temperature during the evacuation of the cavity. In addition, such seals permit resolving the sealing problem caused by the appearance of cracks in the insulating layer covering the elements of the tube. Effectively, the metal of these seals is sufficiently soft so that it may penetrate into these cracks and block them completely when the seals are forcibly compressed between two elements of the tube.

Finally, these metallic seals are less sensitive to ionic bombardment from the plasma during operation of the laser.

However, when such metallic seals are compressed between two metallic bodies of the tube so that they penetrate into the cracks of the insulation layer of these elements, they may come into contact with non-protected metal at the bottom of such cracks and thus provoke a short-circuit between such elements, this preventing operation of the laser.

On the other hand, compressing means such as those which have been described in the Patent No. EP-B-O 048 690 mentioned hereinabove must be dimensioned so as to exert on the tube the sum of the forces which must be applied to each one of the seals in order that the latter assure sealing of the tube. Each of these forces is much greater when the seal is metallic rather than when it is of plastic.

If the seals are metallic and if the number of elements of the tube is relatively great, the total force which must be exerted by the compression means becomes very substantial. In such a case, compressing means such as those which have been described in the Patent No. EP-B-O 048 690 are unusable in practice since their dimensions become much too great.

To overcome this difficulty one could provide, rather than a single compressing means, as many compressing means as there are metallic bodies forming the tube, e.g. screws pressing two of these bodies against one another alternatively.

Whatever may be the solution chosen, that of the cited patent or that which has just been suggested to remedy the difficulties thereof, there will always be the necessity of providing compressing means for the assembly of the tube and such means will require parts particularly adapted to this end and necessitating an assembly time which may be substantial. The systems so far proposed moreover are inadequate to guarantee absolute sealing. At the limit they may be admitted for a laser the interior of which is accessible since, in such case, defects of sealing or of insulation of one of the metallic bodies may be overcome or remedied by disassembling the tube and changing the defective body. A sealed laser on the other hand must exhibit during its entire life an absolute sealing and perfect insulation between the elements since in principle it is not repairable in view of the inaccessibility of its interior. Such lasers are often preferred to dismountable lasers because of their greater reliability.

The principal object of this invention is to provide a gas laser in which the anode and cathode chambers and the metallic bodies of which the discharge tube is comprised are hermetically sealed to one another while being insulated from one another.

Another purpose of the invention is to provide a gas laser which is completely sealed and comprises, in addition to the anode and cathode chambers and the discharge tube already mentioned, anode and cathode supports sealed to the anode and cathode chambers, said supports bearing in a sealed manner the Brewster windows, the electrode passages and the pumping channels.

A further purpose of the invention is to provide a method of assembling of the internal parts of such gas laser including the anode and cathode chambers and the discharge tube.

SUMMARY OF THE INVENTION

The gas laser according to the invention is principally characterized in that to each of the metallic bodies comprising the discharge tube and to the anode and cathode chambers is fixed at least one circular tubular element mounted coaxially to the axis of the ionization chamber, the interior diameter of said tubular element being greater than the diameter of the ionization chamber and that a glass bead is placed between said tubular elements in order to seal them hermetically to one another, the coefficient of thermal expansion of each of said tubular elements being substantially the same as the coefficient of thermal expansion of the glass.

BRIEF DESCRIPTION OF THE DRAWINGS

FIG. 1b is a cross-section along line I—I of FIG. 1a;

DESCRIPTION OF THE PREFERRED EMBODIMENT

Figure 1A:
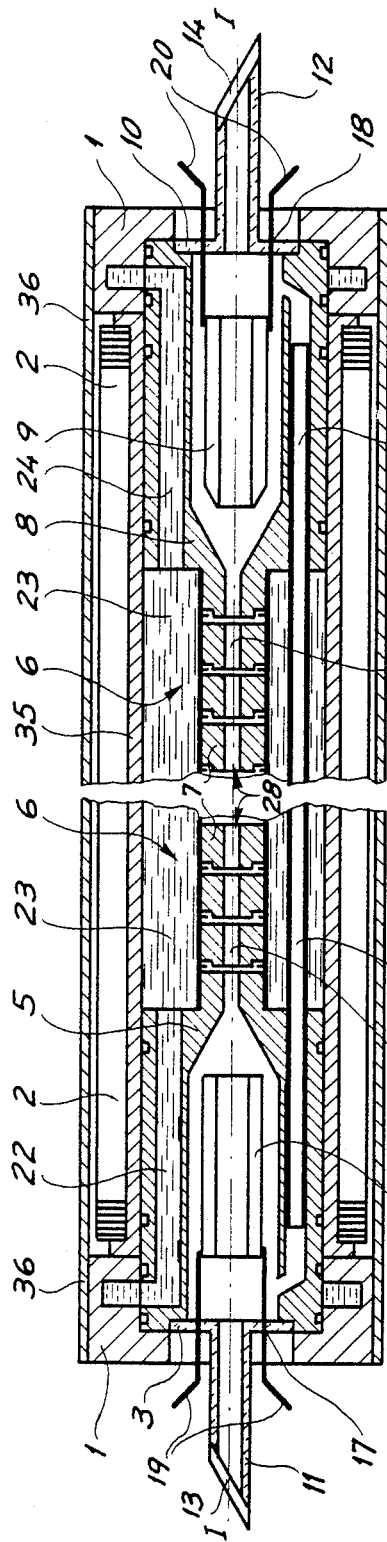
FIG. 1a is a cross-sectional drawing showing schematically the assembly of the gas laser according to a first embodiment of the invention.
Figure 1B:
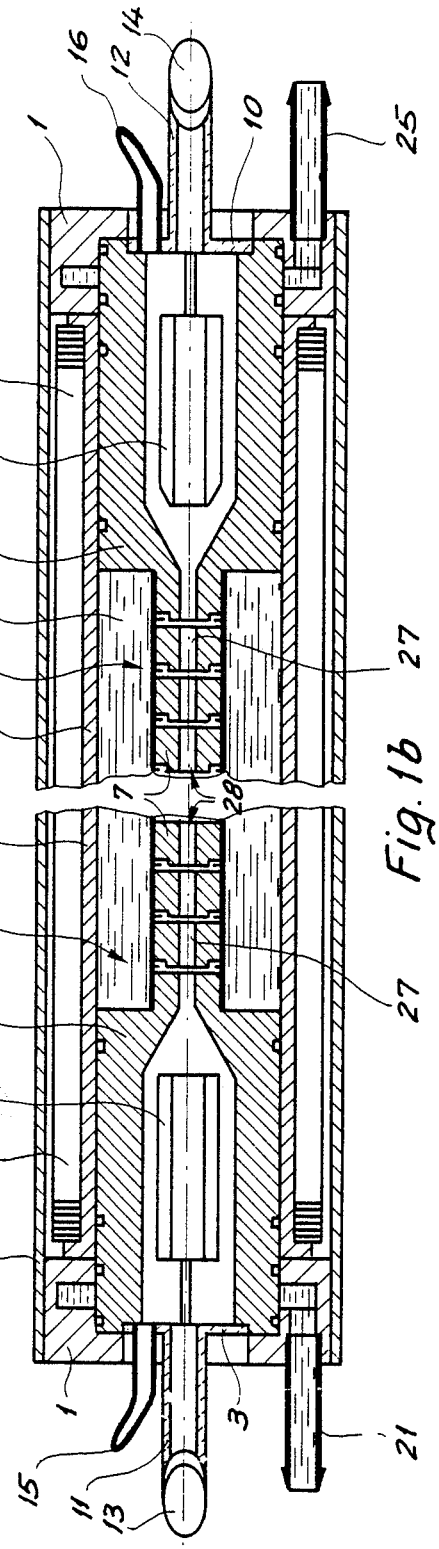

FIGS. 1a and 1b represent a cross-section of the gas laser assembly according to a first embodiment of the invention. The latter includes an interior part which will be defined hereinafter, end closure plates 1, an interior annular tube 35 entirely surrounding the inner part and bounding a space 23 where cooling fluid may circulate, a winding 2 intended to create a magnetic field for confinement of the laser beam, and finally an enclosing tube 36.

The interior part forms a hermetically sealed enclosure which comprises successively a support 3 for cathode 4 and which blocks a cathode chamber 5, a discharge tube 6 fashioned from a multiplicity of metallic bodies 7 arranged end to end, and a chamber 8 for an anode 9 blocked by an anode support 10. Each metallic body 7 is provided with a central opening 27 in order to form, when said metallic bodies are assembled, the ionization chamber 28. Cathode and anode supports 3 and 10 each bear a pipe respectively referenced 11 and 12 at the end of which is placed a Brewster window respectively 13 and 14. If one places a mirror (not shown) at each of the ends of the enclosure thus formed, one will have a resonant cavity adapted to produce a laser beam according to the known theory of this type of apparatus. The enclosure which has just been defined is filled with a gas, for instance argon at low pressure (0.1 to 10 mbar). To this end each of supports 3 and 10 includes a channel referenced respectively 15 and 16 by which it is possible initially to evacuate the air contained in the enclosure to a high vacuum ($10^{-5}$ to $10^{-6}$ mbar), then to introduce therein a gas, this latter forming the amplification medium of the laser. Following this operation, each of channels 15 and 16 is closed as is shown on FIG. 1b. It is further seen that supports 3 and 10 comprise passages respectively referenced 17 and 18 by which electrodes 19 and 20 are introduced in the cathode and anode chambers which serve at the same time to support and to connect the cathode 4 and the anode 9. Supports 3 and 10 as well as pipes 11 and 12 may be formed of molybdenum. In this case electrodes 19 and 20 are insulated from supports 3 and 10 by means of passages 17 and 18 formed with glass. The cathode and anode are here shown in a schematic manner. Further details thereof may be found in European patent No. EP-B-O 048 690 already cited.

As has been seen, the several chambers comprising the laser are under very low pressure which must be maintained throughout its operational life time if one is to assure constant characteristics thereto. The chambers as well as the various passages which have been mentioned must thus be absolutely gas tight.

FIGS. 1a and 1b show further the cooling circuit of the laser formed by an inlet nozzle 21, a first duct 22 provided in the cathode chamber 5, a space 23 entirely surrounding the ionization chamber 6, a second duct 24 provided in the anode chamber 8, and an output nozzle 25. Such laser arrangements are characterized from the point of view of their operation by a very high current density in the gaseous amplification medium which density is on the order of 400 to 500 A/cm$^2$, this necessitating the provision of a highly effective heat removal system.

The cooling medium may be water or oil. The figures show that the ionization chamber 6 is entirely immersed in this water or oil from whence the necessity of perfect sealing of the ionization chamber in order to avoid every risk of fluid leakage towards the latter or indeed towards the anode and cathode chambers.

FIGS. 1a and 1b finally show that the laser is provided with re-circulation ducts for the gas of which a single one, shown as 26, appears on FIG. 1a. These ducts are hermetically sealed to the anode and cathode chambers in a suitable manner. They have as purpose to avoid formation of a pressure gradient which would suffice to annul the discharge, such gradient being provoked by migrations of the positive ions and neutral atoms towards the anode. Such migration is due to the high current density prevailing in the discharge tube.

The present invention discloses a solution to the sealing problems relating to the fluid and to the gas which have been mentioned hereinabove. This sealing may be obtained by means of various embodiments or variants of these embodiments which are now about to be described.

Figure 2:
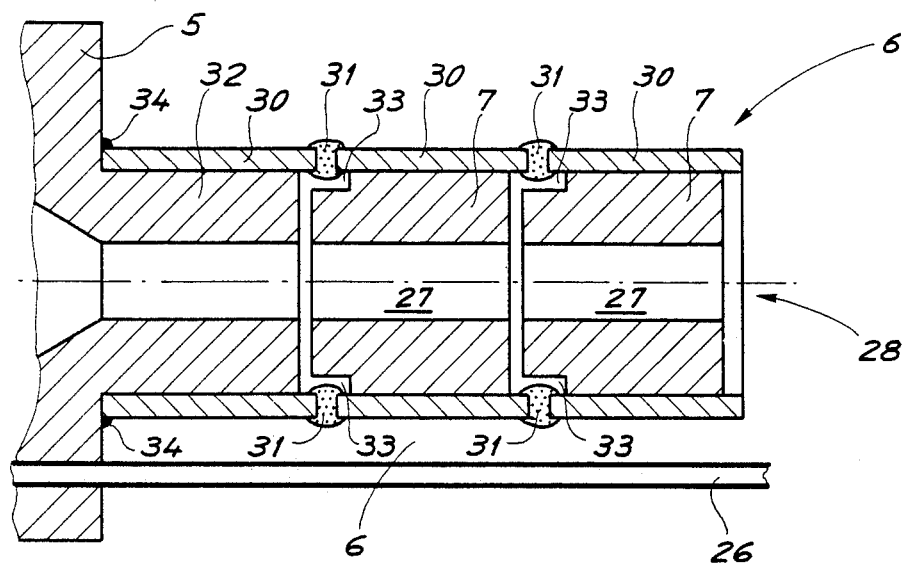
FIG. 2 is a detail drawing showing how the metallic bodies and the cathode chamber forming the laser shown on FIGS. 1a and 1b are assembled.

FIG. 2 is a detail drawing showing how the metallic bodies 7 and the cathode chamber 5 forming a part of the laser shown on FIGS. 1a and 1b are assembled. Metallic bodies and anode and cathode chambers are formed of metal having a high thermal conductivity, this permitting good removal of the heat by the heat transfer liquid which surrounds the discharge tube. However, since it is necessary to maintain between the anode and the cathode a continuous potential gradient, not only must the metallic bodies be insulated from one another, but further the internal wall of each central opening 27 must be provided with an insulating coating. If the metallic bodies are of aluminum or aluminum alloy (corrosion resistant for instance), it will be simple to have them undergo a surface oxidizing treatment which will cover them with aluminum oxide, an excellent insulating material, which may attain a thickness on the order of 50 $\mu$m. However, absolute hermetic sealing and electrical insulation of the metallic bodies between themselves poses a problem which has not been resolved by the disclosures in the document No. EP-B-O 048 690 previously mentioned, at least for the case of a sealed laser.

If one were to employ glass or any other compound of silicon for such sealing, one could assure gas tight sealing and perfect insulation between the metallic bodies, the glass exhibiting furthermore an excellent resistance to the high temperatures which prevail in a laser apparatus. Unfortunately, welding of glass to aluminum appears impractical because of the high thermal expansion coefficient of aluminum and of the small thermal expansion coefficient of glass. Such sealing would be likely to fail sooner or later.

Thus the idea of the invention in its broadest sense consists in putting into practice the sealing under glass of a material exhibiting the same thermal expansion coefficient as that of the glass. Said material is present in the form of at least one circular tubular element fixed to each metallic body and to the anode and cathode chambers, said element being mounted coaxially to the axis of the ionization chamber and exhibiting an interior diameter greater than the diameter of said ionization chamber, a glass bead being placed between each of these tubular elements. Substantial temperature differences may then arise without risking rupture of the weld.

Numerous types of glass are known as welding agents, either by glass coating of the parts (passage of current) or by deposition of glass powder with a binder forming a paste sometimes referred to as "glass-frit" (used for closing colour television tubes). For instance, one may cite the products marketed by the U.S. company Corning and which are distinguished by a low welding temperature (on the order of 500° C.).

Materials having substantially the same properties of thermal expansion as those of glass are likewise known. These are generally alloys of nickel containing approximately 29% nickel, 17% cobalt, the rest being of iron. They exhibit an expansion coefficient resembling that of glass not only for a predetermined temperature but for a range of temperatures extending generally up to the temperature of softening of the glass. Such a material is produced for instance by the company Stupakoff Ceramic and is known under the registered trademark Kovar.

Returning now to the special embodiment shown in FIG. 2, it will be noted that each of the metallic bodies 27 is cylindrical and is entirely surrounded by a single tubular element 30. This tubular element 30 is formed of the material which has been suggested hereinbefore. Between each of elements 30 is placed a glass bead 31 which assures hermetic sealing thereof. The end 32 of the cathode chamber 5 facing the discharge tube 6 and likewise formed of material having a high thermal conductivity exhibits a diameter substantially equal to the diameter of the cylindrical metal bodies 7. This end is likewise covered by a tubular element 30 which is sealed to the neighbouring element by the same type of glass bead 31. Although not shown on the drawing, the same construction is employed for the anode chamber 8 (see FIGS. 1a and 1b).

FIG. 2 further shows that the tubular elements 30 are conformed to one another so as to be placeable end to end whereat to apply their sealing 31. It will be understood that the tubular elements 30 could assume a different form at the place of sealing, for instance in a manner which will be described subsequently in reference to FIG. 3. In FIG. 2, it is further seen that the cylindrical metal bodies 7 are provided with a seating 33 around which is placed the glass bead 31. In such manner there is avoided direct exposure of the glass to the ionic bombardment. It will be further noted that the element 30 surrounding the extremity 32 of the cathode chamber 5 is brazed onto the said chamber at the place referenced 34 by means of the addition of material as will be described subsequently with reference to FIG. 4b. Finally, in order to assure good adhesion of the tubular elements 30 to the metallic bodies 7, one may employ a procedure referred to as shrink fitting by which one cools the bodies 7 in order to bring about a diminution of their diameters. One then introduces thereon the tubular elements which adhere solidly thereto when the bodies have regained their normal temperature.

As soon as the metallic bodies 7 and the ends 32 of the cathode and anode chambers have been provided with their tubular element 30, they are aligned end to end on a suitable fixture taking care to provide a sufficient space between said elements. Next said spaces are filled with the glass paste spoken of previously and the assembly thus formed is introduced into an oven. It is maintained therein during a predetermined time at a temperature adapted to bring about welding of the glass with the tubular elements. It will be understood that in order that the space between the elements remain the same during the entire operation, it is indispensable that the fixture be formed of the same material as that employed for the said tubular elements.

Figure 3:
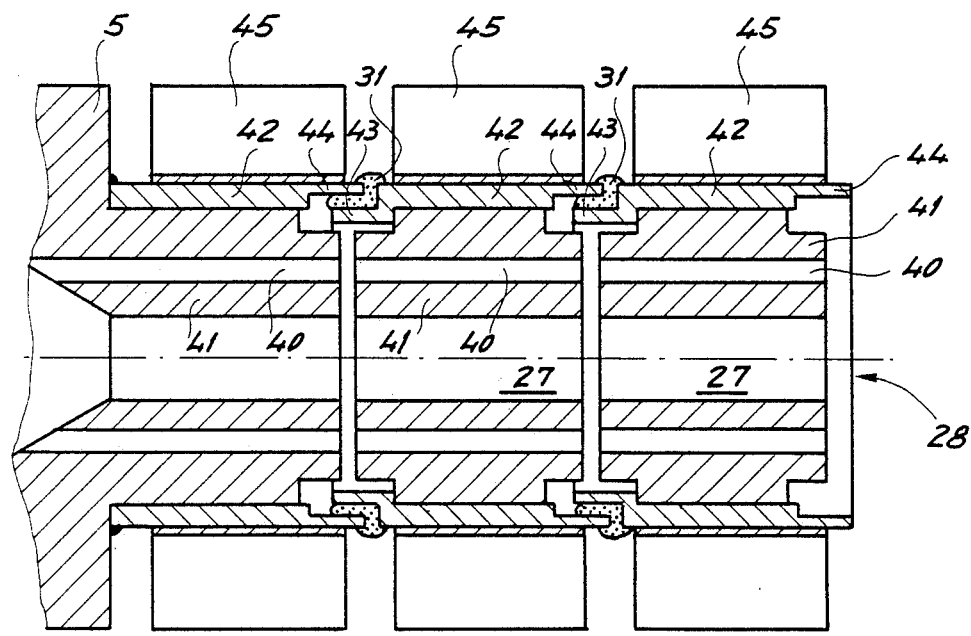
FIG. 3 is a variant of the embodiment shown in FIG. 2.

FIG. 3 is a variant of the embodiment which has just been discussed hereinabove. It is distinguished by three features which are independent from one another but which for reasons of simplicity are incorporated in the same drawing.

In this variant it is seen that the gas recirculation ducts are no longer the tubes 26 arranged outside the metallic bodies 7 and tubular elements 30 adapted to said metallic bodies as was the case in FIG. 2, but that these ducts comprise orifices 40 provided in the part of the metallic bodies 41 situated between the ionization chamber 28 and the tubular elements 42. In this form of execution there is the advantage of avoiding sealing problems as was the case for tubes 26 of FIG. 2.

It is seen likewise in FIG. 3 that the tubular elements 42 are conformed to one another at their ends 43 and 44 to overlap or nest into one another where the glass bead 31 is placed. This arrangement provides several advantages: that of being able to position exactly the tubular element 42 relative to the metallic body 41 thanks to the shoulder exhibited by the end 43; that also of avoiding exposure of the glass seal to direct ionic bombardment; finally, that of easier application of the glass paste to the sealing place prior to solidification of such paste.

FIG. 3 finally shows that each tubular element 42 is surmounted by cooling fins 45. Such fins may be formed from folded sheet metal as is shown for instance in U.S. Pat. No. A-3,763,442.

As indicated hereinabove, the three features which have just been described are not functionally associated with one another. Thus a single one of these, or two, or three at the same time may be employed to improve the laser of the invention.

Figures 4A, 4B:
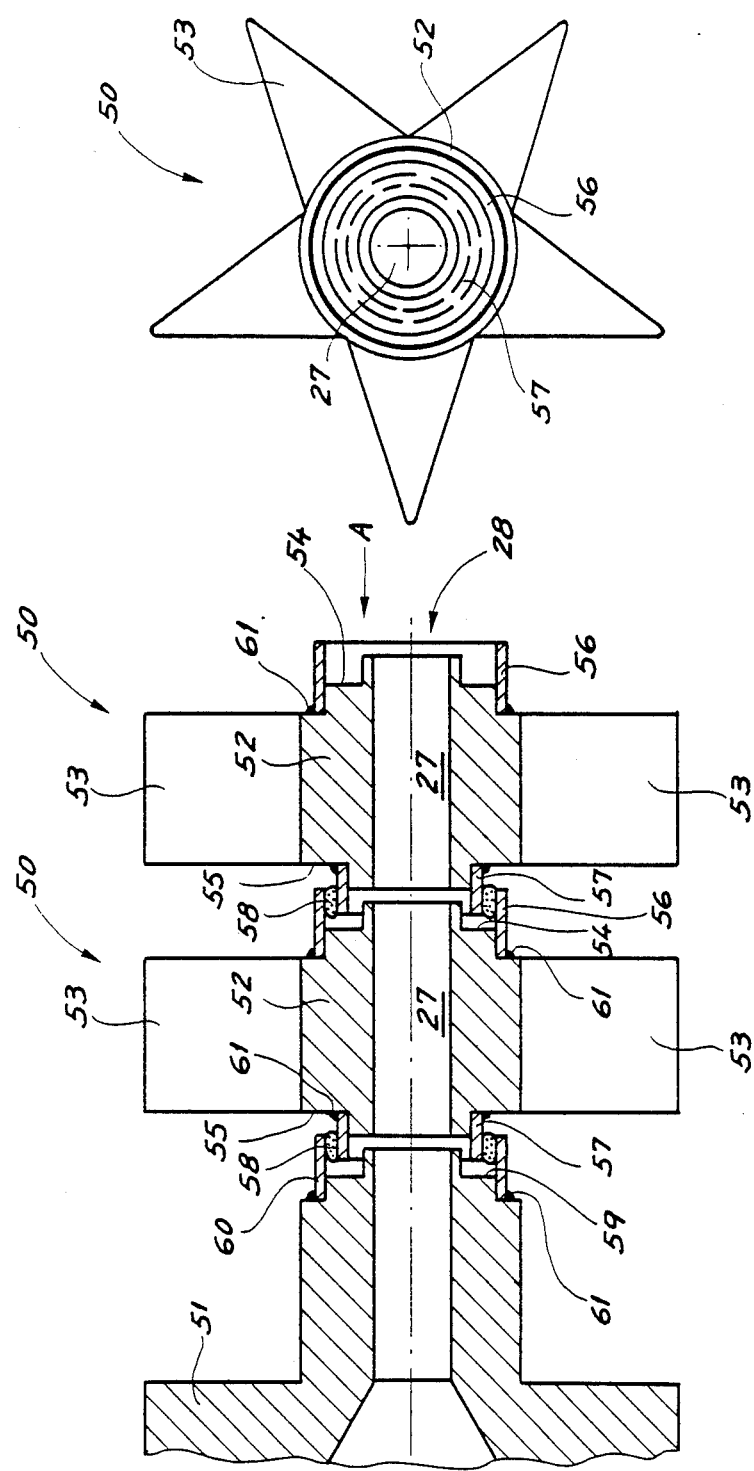
FIG. 4a is an end view (looking towards A on FIG. 4b) of a metallic body forming the discharge tube according to a second embodiment of the invention.
FIG. 4b shows in transversal cross-section how the metallic bodies of FIG. 4a are assembled and how such assembly is fitted to the cathode chamber.

FIGS. 4a and 4b show a second embodiment of the invention. FIG. 4a is an end view (looking towards A on FIG. 4b) of a metallic body 50 forming the discharge tube while FIG. 4b is a transversal cross-section showing how the metallic bodies 50 shown in FIG. 4a are assembled and how this assembly is fitted to the cathode chamber 51.

In this embodiment, each of the metallic bodies 50 exhibits the form of a hub 52 surmounted by cooling fins 53 integrally formed with the hub 52. This form, more massive than that described hereinbefore, is particularly well adapted for a high power laser since the cooling fins, formed for instance of aluminum or aluminum alloy, similar to the hub enable a better removal of the heat.

FIGS. 4a and 4b further show that faces 54 and 55 of each of the hubs 52 are provided with tubular elements referenced respectively 56 and 57. Each of these elements exhibits the form of a circular tube coaxial to the ionization chamber 28 and for which the interior diameter is greater than the diameter of chamber 28. In the special case shown in FIGS. 4a and 4b elements 56 and 57 have different diameters in a manner such that they overlap or nest on one another when two metallic bodies are mounted end to end. The same construction is adopted for face 59 of the cathode chamber 51 which is provided with tubular element 60. Here there is to be found as in the first embodiment a glass bead 58 arranged between tubular elements 56 and 57 or 60 and 57 in order to seal them hermetically. Here also the tubular elements 56, 57 and 60 as well as the metallic body 52 are arranged in order that the sealing 58 is not directly exposed to ionic bombardment. It is clear that other arrangements could be envisaged, that among others which consists of providing tubes of the same diameter which are sealed end to end in a manner which has been described with reference to FIG. 2.

In the form shown on FIG. 4b, the tubular elements are brazed onto the metallic bodies according to a circumference referenced 61. An aluminum-kovar brazing may be provided by means of a product based on cadmium, for instance the brazing material bearing number 1827 of the Castolin company. By such brazing the tubular elements are fixed and sealed to the metallic bodies. One sees furthermore that the cheeks 54 and 55 of each of these hubs 52 exhibit turned shoulders of different diameters. On these shoulders the tubular elements 56 and 57 are initially introduced and then brazed. One may finally proceed with sealing of the tubular elements among themselves by means of a fixture as has been explained with reference to FIG. 2.

As soon as the metallic bodies and the anode and cathode chambers are sealed together, there remain to be sealed supports 3 and 10, which are in the form of discs, to the outlets of chambers 5 and 8 respectively (see FIGS. 1a and 1b). This sealing may be effected by brazing. Previously, one will have taken care likewise to seal by means of a glass-frit the Brewster windows 13 and 14 onto pipes 11 and 12 borne by discs 3 and 10 respectively. In the same manner, electrodes 19 and 20 and channels 15 and 16 which traverse respectively discs 3 and 10 will be sealed. By channels 15 and 16 one may initially evacuate the air from the laser enclosure, then effect filling thereof by means of a gas, for instance argon to the necessary pressure. Finally, channels 15 and 16 will be closed.

What I claim is:

1. A gas laser including a discharge tube formed from a plurality of metallic bodies of a high thermal conductivity arranged end to end without contacting one another and provided with a central opening to form an ionisation chamber, an anode chamber arranged at one end of the tube and provided with an anode support, a cathode chamber arranged at the other end of the tube and provided with a cathode support, gas recirculation ducts providing a communication path between the anode and cathode chambers other than that of the ionisation chamber, at least one element in the form of a circular tube being fixed to each of said metallic bodies and to said anode and cathode chambers, said elements being mounted coaxial with the axis of the ionisation chamber and having an interior diameter greater than the diameter of said ionisation chamber, a glass bead being deposited between each of said tubular elements so as to seal them hermetically to one another, the coefficient of thermal expansion of each of said tubular elements being substantially the same as the coefficient of thermal expansion of the glass.

2. A gas laser as set forth in claim 1 wherein each of the metallic bodies is of cylindrical form and entirely girdled by a single tubular element, the ends of the anode and cathode chambers facing the discharge tube having a diameter substantially equal to that of the metallic cylindrical bodies, said ends being entirely girdled by a single tubular element.

3. A gas laser as set forth in claim 2 wherein the tubular elements are conformed so as to be situated end to end at the place of their sealing.

4. A gas laser as set forth in claim 2 wherein each tubular element is surmounted by cooling fins.

5. A gas laser as set forth in claim 1 wherein each of the metallic bodies exhibits the form of a hub surmounted by cooling fins integral therewith, the end faces of each hub being provided with a tubular element, the end faces of the anode and cathode chambers facing the discharge tube being likewise provided with a tubular element.

6. A gas laser as set forth in claim 5 wherein the tubular elements are conformed so as to overlap one another at the place of their sealing.

7. A gas laser as set forth in claim 5 wherein the tubular elements are brazed onto the hub faces.

8. A gas laser as set forth in claim 1 wherein the gas recirculation ducts comprise orifices formed in the portion of the metallic bodies located between the ionisation chamber and the tubular elements.

9. A gas laser as set forth in claim 1 wherein the gas recirculation ducts comprise tubes sealed in a gas tight manner to the anode and cathode chambers and placed outside the metallic bodies and the tubular elements fixed thereto.

10. A gas laser as set forth in claim 1 wherein the anode and cathode supports comprise discs sealed to the outlets of the anode and cathode chambers, each of the discs including a pipe at the end of which is sealed a Brewster window, gas tight passages through which the energization electrodes are introduced respectively into the anode and cathode chambers and channels by means of which the laser cavity may be successively evacuated of air found therein and then refilled with the gas constituting the laser amplifying medium.

* * * * *